June 18, 1963 Z. J. JANIA ETAL 3,094,203
CLUTCH AND PRESSURE MODULATOR VALVE
Filed April 14, 1960 3 Sheets-Sheet 1

INVENTORS.
ZBIGNIEW J. JANIA
BY ARNOLD E. ANDERSON

ATTORNEYS.

June 18, 1963  Z. J. JANIA ETAL  3,094,203
CLUTCH AND PRESSURE MODULATOR VALVE
Filed April 14, 1960  3 Sheets-Sheet 2

INVENTORS.
ZBIGNIEW J. JANIA
ARNOLD E. ANDERSON
BY John R. Faulkner
Donald J. Harrington
ATTORNEYS.

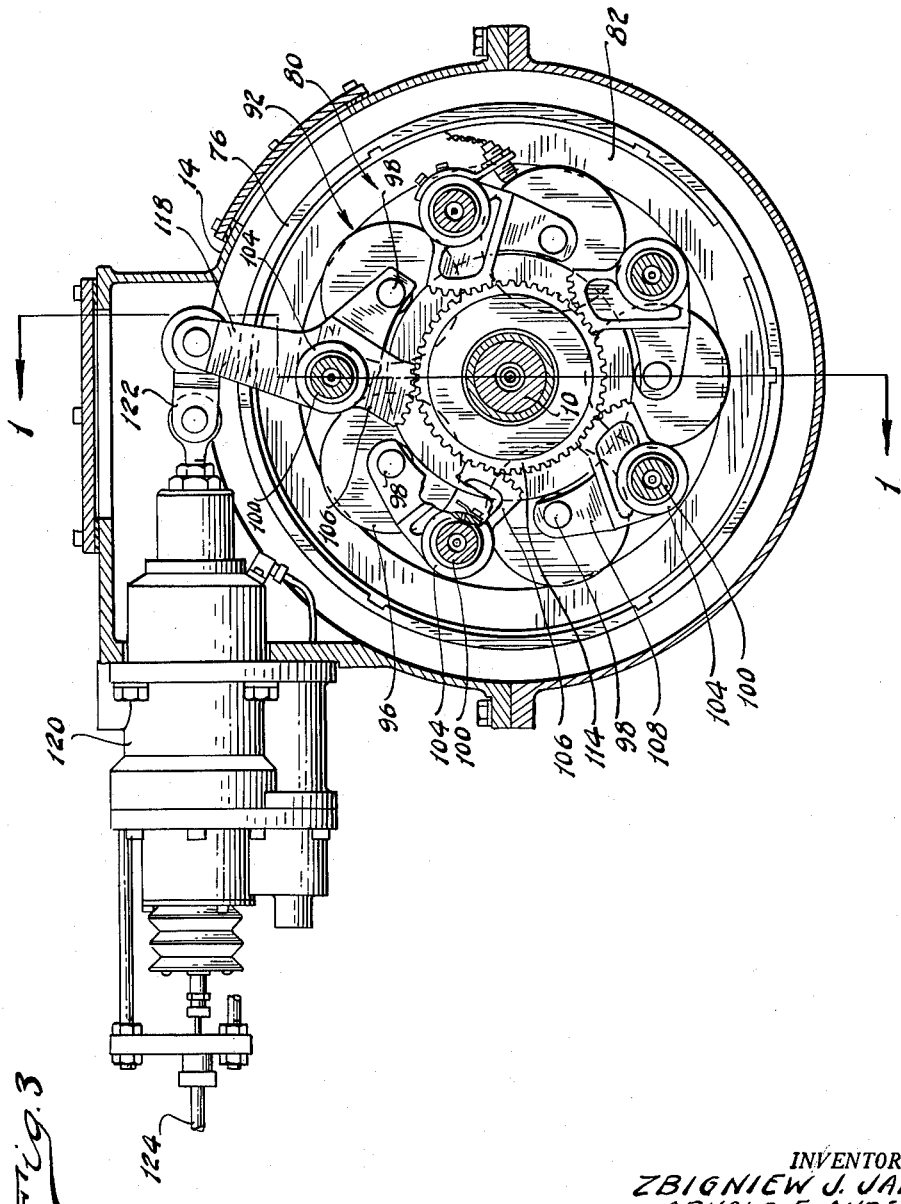

United States Patent Office 3,094,203
Patented June 18, 1963

3,094,203
CLUTCH AND PRESSURE MODULATOR VALVE
Zbigniew J. Jania, Detroit, and Arnold E. Anderson, Livonia, Mich., assignors to Ford Motor Company, Dearborn, Mich., a corporation of Delaware
Filed Apr. 14, 1960, Ser. No. 22,284
9 Claims. (Cl. 192—85)

Our invention relates generally to fluid pressure controlled torque transmitting mechanisms, and more particularly to a pressure regulator adapted to be used with a fluid pressure operated servo that is normally subjected to high rotative speeds during operation.

Although our invention is capable of being used in a variety of environments, we contemplate that our invention may be adapted for use with an infinitely variable friction disc power transmission mechanism having one or more driving discs in frictional driving engagement with one or more driven discs or having driving and driven discs disposed in frictional driving engagement with intermediate idler discs. A fluid pressure operated servo may be used in such arrangements for the purpose of supplying a disc clamping force and to establish a driving relationship between the cooperating discs.

In one preferred embodiment of our invention, a power input shaft and a power output shaft are situated in coaxial disposition. The power input shaft is positively connected to a first assembly of friction discs and is adapted to rotate therewith about a common axis. A driven shaft is positively connected to a second assembly of relatively large diameter friction discs which rotate conjointly with the driven shaft. A plurality of intermediate friction disc assemblies is situated between the first and second disc assemblies, and the individual discs of the intermediate disc assemblies are disposed in frictional driving engagement with the individual discs of the first and second disc assemblies. Provision is made for moving the intermediate disc assemblies radially inward and outward with respect to the common axis of the driving and driven shafts, and in this way the effective radius of contact between the intermediate disc assemblies and the first disc assembly and between the intermediate disc assemblies and the second disc assembly may be varied in order to establish an infinitely variable range of driving speed ratios.

The clamping effort that is necessary to establish frictional driving engagement of the intermediate disc assemblies with the second disc assembly is obtained by means of a fluid pressure operated piston disposed within a pressure chamber located within a rotary clutch member at a radially outward region. Passage structure is provided for establishing fluid communication between the pressure chamber and a fluid pressure source. A fluid pressure pump driven by the power input portion of the mechanism may serve as a pressure source.

Because of the radially outward location of the fluid pressure chamber and because of the rotation of the aforementioned clutch member, a centrifugal pressure build-up takes place within the pressure chamber. The total effective pressure acting on the piston is then equal to the sum of the pressure made available by the pressure source and the centrifugal head. It is undesirable to allow the total effective pressure to increase beyond an optimum value since the operating efficiency of the torque transmitting mechanism would thereby be substantially reduced. Further, any pressure in excess of that which is required to establish the necessary torque transmitting capacity of the disc assemblies will tend to unduly accelerate disc wear. It is possible to maintain a lubricating oil film between the contacting areas of the cooperating discs when normal clamping pressures exist, but proper lubrication becomes quite difficult when an excessive clamping pressure is experienced.

Further, an excessive clamping pressure between the cooperating friction disc assemblies will unduly complicate the problem of obtaining adjustments in the radial position of the intermediate disc assemblies, especially in those instances in which the radial adjustment is automatically obtained by means of a control mechanism that acts in response to changes in operating variables such as engine torque and output speed.

According to a principal feature of our invention, we have made provision for controlling and regulating the total effective clamping pressure acting on the disc assemblies, and in this way the centrifugal effects above described are desirably modified or neutralized.

The provision of such an improved assembly being a principal object of our invention, it is a further object of our invention to provide a torque transmitting mechanism of the type above set forth which includes a pressure regulator valve means for obtaining a desired relationship between the centrifugal pressure head and the pressure head made available by the pressure source so that the combined effective clamping pressure will be at an optimum level regardless of the rotary speed of the driven member.

It is a further object of our invention to provide a pressure regulator valve of the type set forth above wherein the centrifugal force acting on a movable valve element of the regulator valve mechanism serves as the actuating agent for the valve mechanism.

It is a further object of our invention to provide a mechanism of the type above described wherein a pressure regulator valve is employed for automatically modifying the pressure which is made available by the pressure source and for reducing the same as the rotary speed of the driven member increases. We contemplate that the amount of this decrease will be equal to the corresponding increase in the centrifugal head. In this way the total effective clamping pressure will be regulated at a substantially uniform value throughout a wide range of speed variations of the driven member.

It is a further object of our invention to provide such a regulator valve means which is characterized further by its simplicity in operation and construction and which requires a minimum of space.

For the purpose of particularly describing a preferred form of our invention, reference will be made to the accompanying drawings wherein:

FIGURE 3 is an end view, partly in cross section, showing the adjusting mechanism for the intermediate disc assemblies of the mechanism shown in FIGURES 1 and 2.

Figure 1:
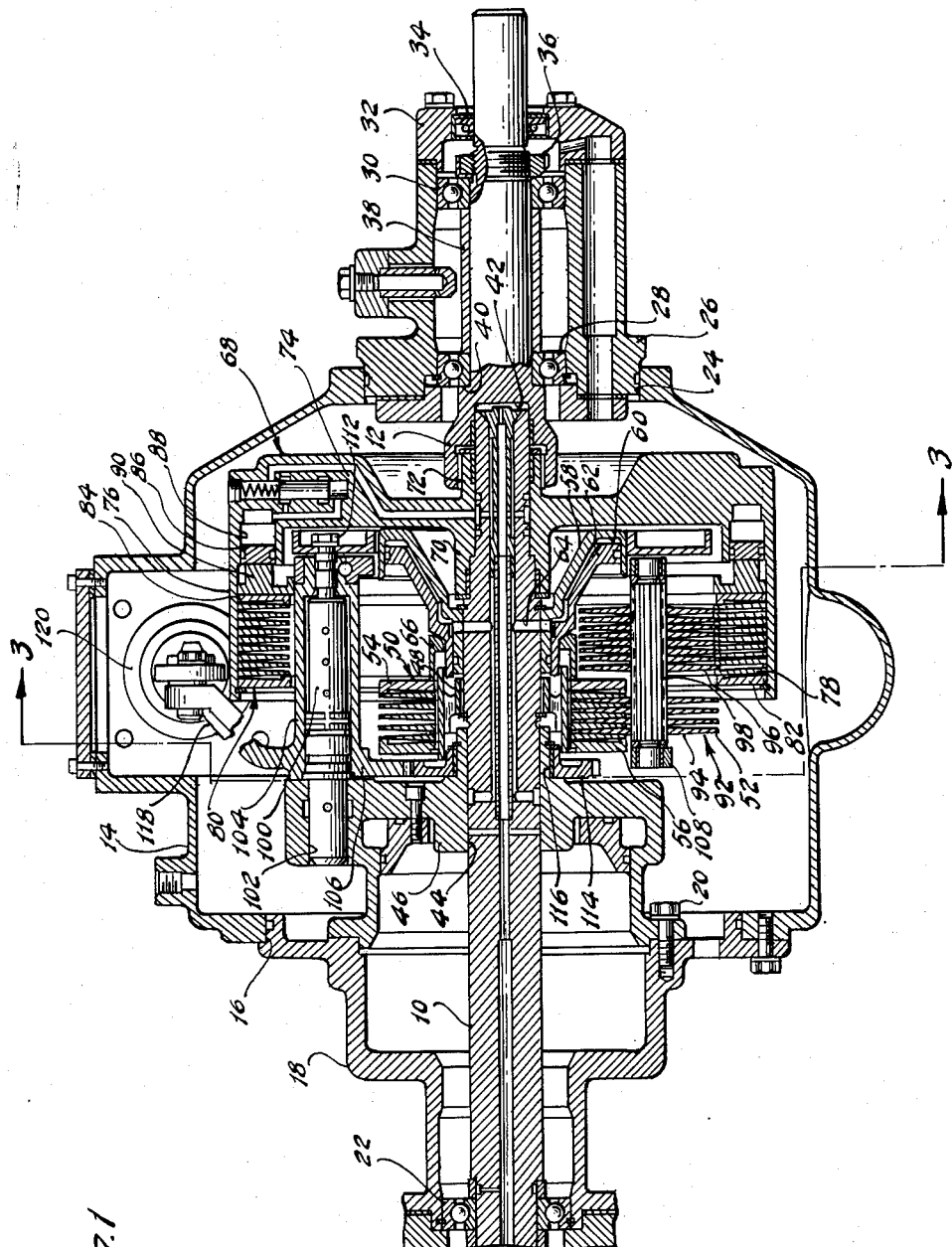
FIGURE 1 is a longitudinal cross sectional assembly view of an infinitely variable disc drive embodying the improvements of our invention.

Referring first to FIGURE 1, the torque transmitting components of the transmission assembly have been suitably mounted within a test fixture or housing. However, these components may readily be housed and journaled within a suitable automotive transmission housing and adapted for installation in an automotive power train.

In FIGURE 1 numeral 10 designates a power input shaft that may be drivably connected to the crankshaft of an internal combustion engine or to some other suitable power source. Numeral 12 designates a power output shaft which may be drivably connected to the traction wheels in a wheeled vehicle.

The housing is generally designated by numeral 14 and it includes a central portion within which the disc assemblies of the transmission mechanism are situated. The left end of housing 14 is provided with an opening 16 within which is situated a bearing retainer 18, said retainer being secured in place by suitable bolts 20. Shaft 10 is journaled within bearing retainer 18 by a suitable ball bearing 22.

The right-hand side of housing 14 is provided with an opening 24 within which is situated a bearing retainer 26. Power output shaft 12 extends through retainer 26 and is journaled therein by ball bearings 28 and 30. A bearing retainer cap 32 may be bolted to the end of retainer 26 as indicated.

A seal is provided as shown at 34 in order to retain lubricant within the region of the bearings. A lock nut 36 is threadably received on shaft 12 for retaining bearing 30 in place. A spacer sleeve 38 is situated between the inner races for bearings 28 and 30 and a shoulder 40 is provided for anchoring the inner race for bearing 28.

The right-hand end of power input shaft 10 is journaled within a pilot bearing recess 42 in power output shaft 40. Power input shaft 10 also extends through a central aperture 44 formed in a boss 46. Boss 46 constitutes a part of the housing 14.

Shaft 10 has splined thereto a hub 48 for a friction disc assembly generally identified by reference character 50. Discs 52 of the disc assembly 50 are internally splined to facilitate a positive connection with the hub 48. A clamping ring 54 is slidably positioned on the hub 48, and a reaction ring 56 is keyed to the hub for absorbing the clamping force of the clamping ring 54. The discs 52 are capable of moving axially with respect to the hub 48.

A servo member 58 is carried by shaft 10 and is situated directly adjacent hub 48. Servo member 58 includes a portion extending in a radially outward direction and it partly defines a servo working chamber 60. A servo piston member 62 is slidably positioned within member 58, and fluid pressure may be distributed to the working chamber 60 through suitable internal passage structure shown in part at 64 to establish a fluid pressure force on piston member 62. The pressure force acting on piston member 62 is transferred to the clamping ring 54 by means of a thrust ring 66.

The shaft 10 is provided with a reduced diameter section upon which is journaled a clutch disc drum generally identified by reference numeral 68. Drum 68 includes a hub 70 which is rotatably supported on shaft 10 by suitable bushings as indicated. Hub 70 is positively splined to shaft 12 as shown at 72.

Drum 68 comprises a radially extending wall 74 and a cylindrical portion 76 is internally splined to facilitate a driving connection with externally splined friction discs 78 which form a multiple friction disc assembly generally identified by reference character 80. The assembly 80 includes a reaction ring 82 that is splined to cylindrical portion 76 and secured in place by a snap ring as indicated. Assembly 80 also includes a clamping ring 84 slidably splined to cylindrical portion 76 of drum 68. A clamping force can be applied to clamping ring 84 by an annular piston 86, the latter being disposed within a cooperating annular cylinder 88. A thrust member 90 is situated between clamping ring 84 and piston 86.

A plurality of intermediate friction disc assemblies is provided for establishing a driving connection between disc assemblies 50 and 80, and in the preferred embodiment herein disclosed there are five such intermediate disc assemblies. In FIGURE 1 one of these intermediate disc assemblies is identified by reference character 92 and it includes a first group of discs shown at 94 and a second group of discs shown at 96, the discs 94 and 96 being spaced axially along a supporting shaft 98. The discs 94 and 96 are splined to shaft 98 although a limited degree of axial movement of the discs 94 and 96 with respect to shaft 98 may be accommodated.

Friction discs 96 and the discs 78 of the disc assembly 80 are situated in interdigital relationship to establish a frictional driving connection therebetween. In a similar fashion, the discs 94 are disposed in frictional driving engagement with discs 52 of the disc assembly 50.

It will be apparent from the foregoing that discs 78 and 96 will become drivably engaged whenever fluid pressure is distributed to cylinder 88, and similarly a frictional driving connection will be established between discs 52 and 94 whenever fluid pressure is distributed to working chamber 60.

The radius of contact between discs 52 and 94 will depend upon the radial position of shaft 98, and the driving speed ratio between shaft 10 and discs 94 will become less as the distance between shaft 98 and shaft 10 increases. Also, the radius of contact for the discs 96 and 78 with respect to the axis of shaft 98 will become progressively smaller as the shaft 98 is moved radially outward. It is therefore apparent that the ratio of the speed of driving shaft 10 to the speed of the driven drum 68 will become progressively smaller as shaft 98 is moved radially outward. Conversely, the speed ratio will increase when the shaft 98 is moved radially inward.

Figure 2:
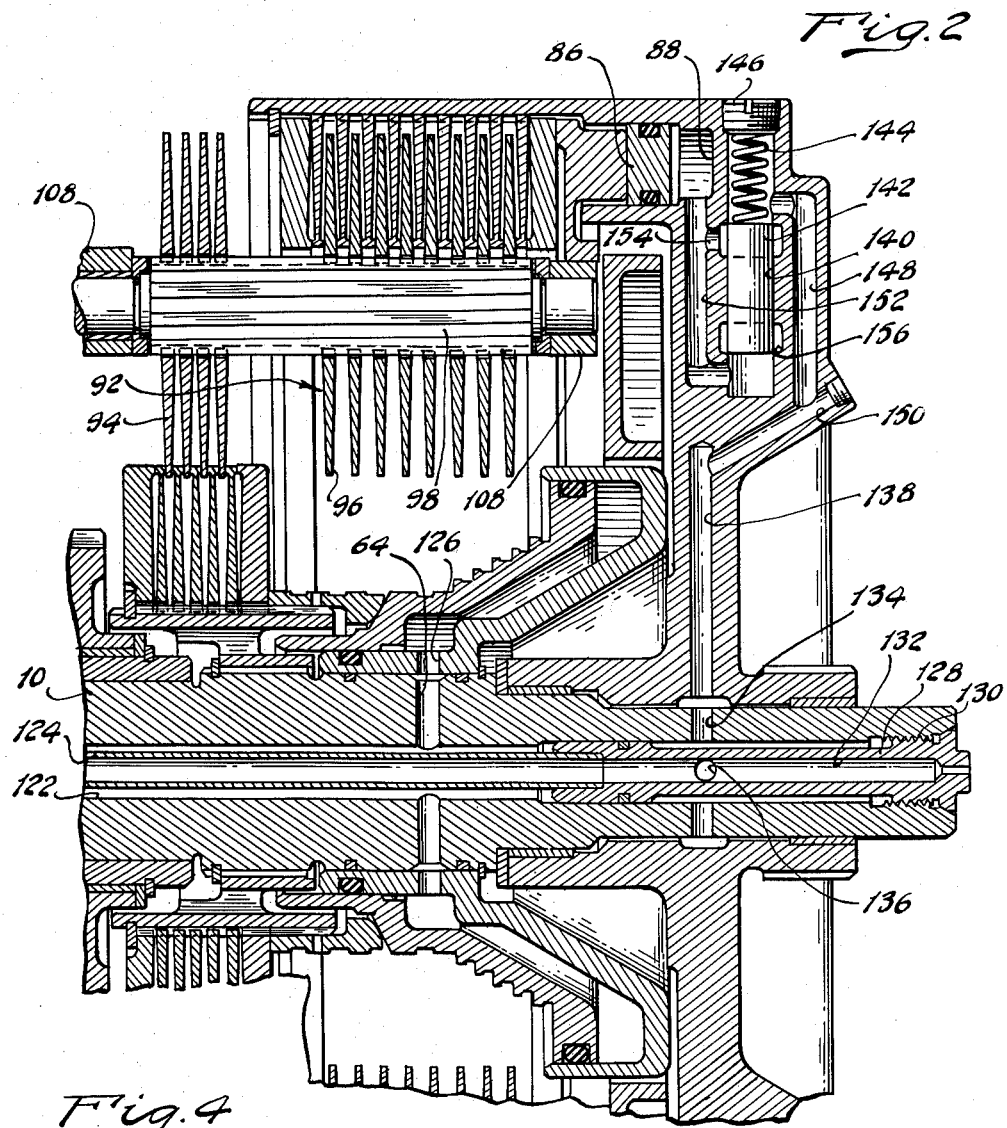
FIGURE 2 is an enlarged view of a portion of the assembly of FIGURE 1 showing our improved regulator valve in more particular detail.

The mechanism for providing a radial adjustment of the shaft 98 and the intermediate friction disc assemblies 92 can best be seen by referring to FIGURES 1–3. Shown in FIGURE 1 is one of several spindle shafts 100 which are received in openings 102 formed in housing wall 46. The shafts 100 are thereby anchored in a relatively stationary position. A sleeve 104 is received over each shaft 100 and is journaled thereon for rotation about the axis thereof. A gear sector 106 is integrally formed on each of the sleeves 104 at one end thereof. The sleeves 104 are also provided with arms 108, one arm 108 being situated at each end of sleeve 104. The spaced arms 108 are adapted to support shafts 98, the latter bridging the space between the spaced arms 108 as shown in FIGURE 3. The free ends of spindle shafts 100 are connected to an annular supporting ring 110 as shown in FIGURE 3, and this connection is formed by externally threading the ends of shafts 100 and by securing the ring 110 to the threaded ends of the shafts by nuts 112.

Each of the geared sectors 106 is situated in meshing engagement with a gear 114 journaled for movement on a stationary sleeve 116 that forms a part of wall 46. One of the sleeves 104 is formed with a bell crank arm 118 as indicated in FIGURES 1 and 3, and it extends in a radially outward direction. The outward end of arm 118 is coupled to a movable piston of a fluid pressure operated servo motor 120, a suitable linkage mechanism 122 being provided for this propose. Control fluid may be admitted to the servo motor 120 through a control pressure passage shown in part at 124. This passage forms a part of an automatic control circuit, not shown or described.

When servo motor 120 is pressurized, bell crank arm 118 will pivot about the axis of the associated shaft 100 in a clockwise direction, as viewed in FIGURE 3. This will cause the sleeve 104 and the gear sector 106 to rotate, and the intermediate friction disc assembly 92 associated with sleeve 104 will therefore be moved in a radially outward direction. The center of the pitch circle for the gear sector 106 coincides with the axis of the associated shaft 100, and the rotary motion of gear sector 106 will cause the gear 114 to rotate about the fixed axis of shaft 10. Gear 14 will therefore cause the other gear sectors 106 to rotate about their respective centers, and the intermediate disc assemblies 92 associated with each of these sector gears will therefore be moved in the same direction as the direction of the movement of the intermediate disc assembly associated with bell crank arm 118. Each of the intermediate disc assemblies may be moved in unison in either a radially outward direction or a radially inward direction, depending upon the direction of the motion of the arm 118. When the intermediate disc assemblies assume the position shown in FIGURE 1, the transmission mechanism is conditioned for high speed operation with a minimum speed reduction ratio.

Referring next to FIGURE 2, we have illustrated one of the disc assemblies 92 in the maximum speed reduction position. In this instance the points of contact between discs 52 and discs 94 are located at a maximum radial distance from the axis of shaft 10. Conversely, the points of contact between discs 78 and discs 96 are located at a minimum radial distance from the axis of shaft 98.

As best seen in FIGURE 2, shaft 10 is centrally bored as shown at 122, and a fluid pressure distributor tube 124 is situated within bore 122 to partly define an annular passage between the tube 124 and the inner wall of bore 122. This passage communicates with the aforementioned passage 64 for distributing control pressure to the working chamber behind piston 62. Passage 64 communicates with one or more ports 126 formed in servo member 58. An annular groove is formed about shaft 10 in the vicinity of ports 126 to provide continuous communication between ports 126 and passage 64. An adaptor 128 is received within the end of bore 122 and is fixed in place by a threaded connection 130. The left end of adaptor 128 receives one end of tube 124 and it is formed with an internal passage 132 which communicates with the internal passage in tube 124. The adaptor 128 cooperates with the bore 122 to define an annular space which is in fluid communication with a radial passage 134 formed in shaft 10. This annular space is also in communication with the internal passage 132 through one or more ports 136 formed in adaptor 128.

The wall 74 is formed with a radially extending passage 138 which communicates with passage 134 as indicated. An annular groove formed in wall 74 in the vicinity of passage 134 provides continuous communication between passages 138 and 134. A radially extending valve chamber 140 is formed in wall 74 of drum 68, and it slidably receives a valve element 142 which may be of cylindrical form as indicated. In the disclosed embodiment of our invention, the valve element 142 is urged in a radial direction by a valve spring 144 which may be seated on a threaded valve chamber closure 146. The portion of the valve chamber 140 which is occupied by spring 144 communicates with a passage 148 which extends radially inward and intersects a passage 150, the latter forming a connection between passage 148 and passage 138. It is thus apparent that the upward portion of the valve chamber 140 is in continuous fluid communication with passage 132 situated along the axis of shaft 10.

The working chamber defined by cylinder 88 and movable piston 86 is in fluid communication with the lower end of valve chamber 140 through a passage 152. Passage 152 also communicates with a port 154 formed at an intermediate location in valve chamber 140. An exhaust port 156 communicates with chamber 140 at a location spaced from port 154 and it communicates with the low pressure sump region within the housing 14.

The dimensions of the valve element 142 and the spacing of the ports 154 and 156 are calibrated so that valve element 152 will function to control the degree of communication between passage 152 and pressure passage 148 and between passage 152 and the exhaust region.

The pressure in the working chamber behind piston 86 which exists during operation is equal to the pressure which is made available by the fluid pressure source communicating with passages 132, 138, 150 and 148 and also by the pressure head caused by rotation of the drum 68. The passage 132 communicates with the fluid pressure source, such as an engine driven fluid pressure pump, through the tube 124 and through other communicating passage structure, not shown. The power output shaft 12 is connected to drum 68 as previously indicated and as the speed of rotation of shaft 12 increases, the centrifugal head acting in the chamber behind piston 86 also increases. Such a pressure build-up is undesirable, as previously explained, since it causes premature disc wear and introduces control problems which would not otherwise exist. The valve mechanism shown in part at 142 and 140 solves this problem by progressively decreasing the magnitude of the effective static pressure made available to the cylinder 88 by the pressure source, and this decrease occurs at substantially the same rate as the rate with which the centrifugal pressure head increases in magnitude for any given increase in speed. Conversely, when the driven speed of shaft 12 decreases from a higher value to a lower value, the valve mechanism will function to provide an increase in the static pressure made available to the cylinder 88 by the pressure source, and the amount of this increase is substantially equal to the decrease in the effective centrifugal pressure head in cylinder 88.

If it is assumed that the valve spring 144 is positioned as shown in FIGURES 1 and 2, the pressure within annular cylinder 88 will progressively increase when the shaft 12 begins to rotate from a standing start and is accelerated. The valve mechanism 142 will therefore regulate the effective pressure in the annular cylinder 88 during this period of acceleration, and this regulation will take place until an ultimate limiting value is reached. When the power output shaft 12 is at rest, the pressure which exists in cylinder 88 will be equal to the pressure made available by the pressure source. During the initial stages of operation, the spring 144 will maintain valve element 142 in a nonregulating position, and accordingly the pressure build-up which occurs in cylinder 88 will be proportional to the square of the speed change. However, the mass of the valve element 142 causes a valve element actuating force which opposes the force of spring 144, and this centrifugal valve actuating force also increases in proportion to the square of the driven shaft speed. After a predetermined shaft speed has been obtained, the valve element 142 assumes the regulating position shown in FIGURES 1 and 2, and thereafter the valve will function to maintain a substantially uniform effective pressure in cylinder 88 since the centrifugal pressure increase in the cylinder 88 is proportional to the square of the speed and since the valve actuating force is also proportional to the square of the speed. The increase in centrifugal head will be equal to the decrease in the static pressure made available by the pressure source.

The operation of the valve can best be explained by means of the following analysis. For purposes of this analysis, the following nomenclature will be used:

$A$ = Valve area
$F_o$ = Elastic spring force with valve centered
$F_s$ = Total spring force with valve centered
$M_s$ = Mass of spring
$M_v$ = Mass of valve
$R$ = Force acting on piston
$a$ = Height of valve $(r_7 - r_6)$
$h$ = Spring length with valve centered
$p_r$ = General pressure at radius $r$
$\bar{p}$ = Effective piston pressure
$r$ = General radius
$\rho_o$ = Mass density of oil
$\rho_v$ = Mass density of valve
$\omega$ = Angular velocity
$r_1$ = Radius of valve cg
$r_2$ = Radius of oil inlet
$r_3 = \sqrt{r_4^2 + r_5^2}/2$
$r_4$ = Inner radius of piston
$r_5$ = Outer radius of piston
$r_6$ = Inner radius of valve
$r_7$ = Outer radius of valve The pressure acting on the outer face of the valve can be represented as follows:

$$p_7 = p_2 + \int_r^{r_7} \rho_o \omega^2 r \, dr$$

$$p_7 = p_2 + \rho_0\omega^2 \frac{r^2}{2}\Big|_{r_2}^{r_7}$$

$$p_7 = p_2 + \rho_0\omega^2 \frac{r_7^2}{2} - \rho_0\omega^2 \frac{r_2^2}{2}$$

$$p_7 = p_2 + \frac{\rho_0\omega^2}{2}(r_7^2 - r_2^2)$$

$$p_7 = p_2 + \frac{\rho_0\omega^2}{2}[r_7^2 - r_2^2] \quad (1)$$

If it is assumed that the spring 144 acts on the valve in a radially inward direction, the spring force can be represented as follows:

$$F_s = F_o - \frac{M_s\omega^2}{2}\left(r_7 + \frac{h}{2}\right) \quad (2)$$

This equation makes provision for the centrifugal force acting on the spring due to the mass of the spring.

The force balance acting on the valve can therefore be represented as follows:

$$p_7 A + F_s \gtreqless M_v r_1 \omega^2 + p_6 A \quad (3)$$

or $$p_6 = p_7 + \frac{F_s}{A} - \frac{M_v r_1 \omega^2}{A} \text{ where } \left(p_7 + \frac{F_s}{A}\right) > \frac{M_v r_1 \omega^2}{A} \quad (3a)$$

and $$p_6 = 0 \text{ where } \left(p_7 + \frac{F_s}{A}\right) < \frac{M_v r_1 \omega^2}{A} \quad (3b)$$

Substituting (1) in (3a) gives $$p_6 = p_2 + \frac{\rho_0\omega^2}{2}[r_7^2 - r_2^2] + \frac{F_s}{A} - \frac{M_v}{A}r_1\omega^2$$

but $$\frac{M_v r_1}{A} = \frac{M_v}{A(r_7 - r_6)}(r_7 - r_6)\frac{(r_7 + r_6)}{2} = \frac{\rho_v(r_7^2 - r_6^2)}{2}$$

for a solid cylindrical valve. Thus, $$p_6 = \left(p_2 + \frac{F_s}{A}\right) + \frac{\omega^2}{2}[\rho_0(r_7^2 - r_2^2) - \rho_v(r_7^2 - r_6^2)] \quad (3a')$$

The pressure at any radius $r \geqslant r_6$ is $$p_r = p_6 + \frac{\rho_0\omega^2}{2}[r^2 - r_6^2] \quad (4)$$

The piston force is then $$R = \int_{r_4}^{r_5} p_r(2\pi r)dr \quad (5)$$

Substituting for $p_r$ and simplifying, gives $$R = \pi(r_5^2 - r_4^2)\left\{p_6 + \frac{\omega^2 \rho_0}{2}\left[\frac{r_5^2 + r_4^2}{2} - r_6^2\right]\right\} \quad (5a)$$

When $p_6 > 0$ Equation 5a becomes $$R = \pi(r_5^2 - r_4^2)\left\{\left(p_2 + \frac{F_s}{A}\right)\frac{\omega^2 \rho_0}{2}\left[\frac{r_5^2 + r_4^2}{2} - r_6^2\right.\right.$$
$$\left.\left. + (r_7^2 - r_2^2) - \frac{\rho_v}{\rho_0}(r_7^2 - r_6^2)\right]\right\} \quad (60)$$

which, when simplified becomes $$R = \pi(r_5^2 - r_4^2)\left\{\left(p_2 + \frac{F_s}{A}\right) + \frac{\omega^2 \rho_0}{2}\left[r_3^2 - r_2^2 - 2ar_1\left(\frac{\rho_v}{\rho_0} - 1\right)\right]\right\} \quad (5a')$$

Since $R = \pi(r_5^2 - r_4^2)\bar{p}$, the effective pressure is $$\bar{p} = p_2 + \frac{F_s}{A} + \frac{\omega^2 \rho_0}{2}\left[r_3^2 - r_2^2 - 2ar_1\left(\frac{\rho_v}{\rho_0} - 1\right)\right] \quad (6)$$

For $p_6 = 0$, $$p_r = \frac{\rho_0\omega^2}{2}(r^2 - r_6^2)$$

and $$R = \int_{r_4}^{r_5} \frac{\rho_0\omega^2}{2}(r^2 - r_6^2)2\pi r \, dr$$

$$R = \frac{\pi\rho_0\omega^2}{4}[(r_5^2 - r_6^2)^2 - (r_4^2 - r_6^2)^2]$$

$$R = \frac{\pi\rho_0\omega^2}{4}[(r_5^4 - r_4^4) - 2(r_5^2 - r_4^2)r_6^2]$$

$$R = \pi(r_5^2 - r_4^2)\frac{\rho_0\omega^2}{2}[r_3^2 - r_6^2]$$

but $$R = \pi(r_5^2 - r_4^2)\bar{p}$$

Thus, $$\bar{p} = \frac{\rho_0\omega^2}{2}(r_3^2 - r_6^2)$$

The operating pressure level of the regulating valve mechanism can therefore be readily calibrated. If different characteristics are desired, the various design parameters can be varied as appropriate. For example, if a lower effective clamping pressure is desired, the spring 144 may be placed on the radially inward side of the valve element 142. This will reduce the magnitude of the effective pressure made available to the cylinder 88 by the pressure source, and as a result the regulated pressure will be reduced to the same extent throughout the entire speed range. Further, if desired, spring 144 can be removed entirely and this will result in substantially constant pressure regulation at a value which is equal to the effective pressure made available by the pressure source.

Figure 4:
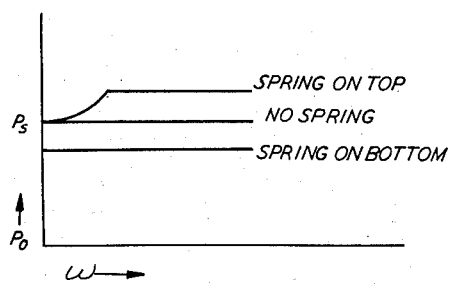
FIGURE 4 is a graphic representation of the regulating characteristic of the regulator valve.

Referring next to FIGURE 4, the regulating characteristics of the valve mechanism are shown in graphic form. If the spring 144 is located on the radially outward side of the valve 142, the effective working pressure will increase in a parabolic fashion as the angular velocity increases. This parabolic relationship will exist until the regulated clamping pressure is obtained. Thereafter the pressure will remain substantially uniform as the angular velocity changes.

FIGURE 4 also shows in graphic form the characteristics which would be obtained if the valve springs were removed, or if the valve springs were located on the radially inward side of valve 142.

Having thus described a preferred embodiment of our invention, what we claim and desire to secure by United States Letters Patent is:

1. In a friction disc power transmission mechanism having a rotary disc carrier member, a multiple disc assembly carried by said carrier member, said carrier member defining an annular cylinder at a radially outward location relative to the axis of rotation thereof, an annular piston disposed in said cylinder, said piston and cylinder defining a fluid pressure chamber, a fluid pressure source, passage structure extending from said pressure source and communicating with said pressure chamber, a valve chamber disposed in and partly defining said passage structure, an exhaust port communicating with said valve chamber, and a valve element movably disposed in said valve chamber, said passage structure including portions extending from said pressure source to points in said valve chamber on radially inward and radially outward sides of said valve element, said exhaust port being located between said points, said valve element being actuated in response to centrifugal force and adapted to control the degree of communication between said pressure source and said pressure chamber and between said pressure chamber and said exhaust port whereby changes in the effective pressure supplied by said pressure source to said pressure chamber will tend to compensate for changes in the centrifugal head in said pressure chamber due to rotation of said carrier member.

2. In a fluid pressure operated clutch having a rotary member, an annular cylinder formed in said rotary member, a fluid pressure source, passage means for distributing fluid pressure from said pressure source to said annular cylinder, a pressure modulator valve means disposed in and partly defining said passage means for reducing the pressure made available to said pressure chamber by said pressure source upon an increase in the speed of rotation of said rotary member, a variation in the magnitude of said pressure for any given speed change being inversely related to the change in centrifugal head in said pressure chamber resulting from said speed change, said valve means including a valve chamber having radially spaced pressure ports communicating with said pressure source and said pressure chamber, an exhaust port communicating with said valve chamber, and a radially movable valve element disposed in said valve chamber, said valve element decreasing progressively the degree of communication between said pressure source and said pressure chamber and uncovering progressively said exhaust port upon an increase in the speed of rotation of said rotary member.

3. In a friction disc power transmission mechanism having a rotary disc carrier member, a first multiple disc assembly carried by said carrier member, a second multiple disc assembly, the individual discs of said second disc assembly being disposed in frictional engagement with the individual discs of said first disc assembly in interdigital driving relationship, said carrier member defining an annular cylinder at a radially outward location relative to the axis of rotation thereof, an annular piston means disposed in said cylinder for transferring hydrostatic pressure forces to said disc assemblies to establish a clamping engagement of the individual discs of said assemblies, said piston means and said cylinder defining a fluid pressure chamber, a pressure source, passage structure extending from said pressure source and communicating with said pressure chamber, a valve chamber disposed in and partly defining said passage structure, an exhaust port communicating with said valve chamber, and a valve element movably disposed in said valve chamber, said passage structure including portions extending from said pressure source to points in said valve chamber on radially inward and radially outward sides of said valve element, said exhaust port being located between said points, said valve element being actuated in response to centrifugal force and adapted to control the degree of communication between said pressure source and said pressure chamber and between said pressure chamber and said exhaust port whereby changes in the effective pressure supplied by said pressure source to said pressure chamber will tend to compensate for changes in the centrifugal head in said pressure chamber due to rotation of said carrier member.

4. In a fluid pressure operated clutch having a rotary member, an annular cylinder formed in said rotary member, a fluid pressure source, passage means for distributing fluid pressure from said pressure source to said annular cylinder comprising a first passage portion and a second passage portion extending respectively from said pressure source and from said annular cylinder, a regulator valve chamber disposed in a substantially radial direction with respect to the axis of rotation of said rotary member, a movable valve element disposed in said valve chamber, said first passage portion communicating with the radially outward end of said valve chamber and said second passage portion communicating with the radially inward end thereof, an exhaust port communicating with said valve chamber at a first location intermediate the points of communication of said first and second passage portions with said valve chamber, and a pressure port situated at a second location intermediate said radially inward and radially outward ends of said valve chamber, said pressure port communicating with said second passage portion, said valve element being urged radially outward under the influence of centrifugal force to control the degree of communication between said first passage portion and said pressure port and between said second passage portion and said exhaust port whereby the effective fluid pressure in said cylinder is maintained at a substantially constant value throughout a wide range of speeds of rotation of said rotary member.

5. In a fluid pressure operated clutch having a rotary member, an annular cylinder formed in said rotary member, a fluid pressure source, passage means for distributing fluid pressure from said pressure source to said annular cylinder comprising a first passage portion and a second passage portion extending respectively from said pressure source and from said annular cylinder, a regulator valve chamber disposed in a substantially radial direction with respect to the axis of rotation of said rotary member, a movable valve element disposed in said valve chamber, said first passage portion communicating with the radially outward end of said valve chamber and said second passage portion communicating with the radially inward end thereof, an exhaust port communicating with said valve chamber at a first location intermediate the points of communication of said first and second passage portions with said valve chamber, a pressure port situated at a second location intermediate said radially inward and radially outward ends of said valve chamber, said pressure port communicating with said second passage portion, said valve element being urged radially outward under the influence of centrifugal force to control the degree of communication between said first passage portion and said pressure port and between said second passage portion and said exhaust port whereby the effective fluid pressure in said cylinder is maintained at a substantially constant value throughout a wide range of speeds of rotation of said rotary member, and spring means situated in said valve chamber and acting on said valve element for modifying the centrifugal response of said valve element.

6. In a fluid pressure operated clutch having a rotary member, an annular cylinder formed in said rotary member, a fluid pressure source, passage means for distributing fluid pressure from said pressure source to said annular cylinder comprising a first passage portion and a second passage portion extending respectively from said pressure source and from said annular cylinder, a regulator valve chamber disposed in a substantially radial direction with respect to the axis of rotation of said rotary member, a movable valve element disposed in said valve chamber, said first passage portion communicating with the radially outward end of said valve chamber and said second passage portion communicating with the radially inward end thereof, an exhaust port communicating with said valve chamber at a first location intermediate the points of communication of said first and second passage portions with said valve chamber, a pressure port situated at a second location intermediate said radially inward and radially outward ends of said valve chamber, said pressure port communicating with said second passage portion, said valve element being urged radially outward under the influence of centrifugal force to control the degree of communication between said first passage portion and said pressure port and between said second passage portion and said exhaust port whereby the effective fluid pressure in said cylinder is maintained at a substantially constant value throughout a wide range of speeds of rotation of said rotary member, and a valve spring situated in said valve chamber, said spring acting on said valve element to urge the latter in a radially inward direction.

7. In a friction disc power transmission mechanism having a rotary disc carrier member, a multiple disc assembly carried by said carrier member, said carrier member defining an annular cylinder at a radially outward location relative to the axis of rotation thereof, an annular piston member disposed in said cylinder, said piston member and cylinder defining a fluid pressure chamber, a fluid pressure source, passage structure extending from said pressure source and communicating with said pressure chamber, a valve chamber disposed in and partly defining said passage structure, a movable valve element disposed in said valve chamber, said passage structure including a first passage portion communicating with said pressure source and extending to a radially outward part of said valve chamber, said passage structure including a second passage portion communicating with said pressure chamber and extending to a radially inward part of said valve chamber, an exhaust port communicating with said valve chamber at a location intermediate said valve chamber parts, and a pressure port communicating with said valve chamber at another location intermediate said valve chamber parts and extending to said second passage portion, said valve element being responsive to centrifugal force upon rotation of said valve member to control the degree of communication between said first passage portion and said pressure port and to control the degree of communication between said second passage portion and said exhaust port whereby changes in the effective pressure supplied by said pressure source to said pressure chamber will tend to compensate for changes in the centrifugal head in said pressure chamber due to rotation of said carrier member.

8. In a friction disc power transmission mechanism having a rotary disc carrier member, a multiple disc assembly carried by said carrier member, said carrier member defining an annular cylinder at a radially outward location relative to the axis of rotation thereof, an annular piston member disposed in said cylinder, said piston member and cylinder defining a fluid pressure chamber, a fluid pressure source, passage structure extending from said pressure source and communicating with said pressure chamber, a valve chamber disposed in and partly defining said passage structure, a movable valve element disposed in said valve chamber, said passage structure including a first passage portion communicating with said pressure source and extending to a radially outward part of said valve chamber, said passage structure including a second passage portion communicating with said pressure chamber and extending to a radially inward part of said valve chamber, an exhaust port communicating with said valve chamber at a location intermediate said valve chamber parts, a pressure port communicating with said valve chamber at another location intermediate said valve chamber parts and extending to said second passage portion, said valve element being responsive to centrifugal force upon rotation of said valve member to control the degree of communication between said first passage portion and said pressure port and to control the degree of communication between said second passage portion and said exhaust port whereby changes in the effective pressure supplied by said pressure source to said pressure chamber will tend to compensate for changes in the centrifugal head in said pressure chamber due to rotation of said carrier member, and spring means situated in said valve chamber and acting on said valve element for modifying the centrifugally induced response of said valve element.

9. In a fluid pressure operated clutch having a rotary member, a fluid pressure chamber formed in said rotary member, a fluid pressure source, passage means for distributing fluid pressure from said pressure source to said chamber, a pressure regulator valve means for modifying the effective pressure change in said chamber due to changes in speed of said rotary member, said valve means comprising a valve chamber defining in part said passage means, a centrifugally responsive valve element in said valve chamber, a branch passage extending from said pressure chamber and communicating with said valve chamber at a radially inward portion of said valve chamber whereby an outwardly directed radial force on said valve element is established, the pressure in the portion of said passage means between said source and said valve chamber communicating with said valve chamber at a radially outward portion of said valve chamber whereby an inwardly directed radial force on said valve element is established, and an exhaust port communicating with said valve chamber intermediate said inward and outward portions, said valve means establishing a modulated pressure in said pressure chamber in response to changes in the variable centrifugal and pressure forces acting on said valve element.

References Cited in the file of this patent

UNITED STATES PATENTS

| | | |
|---|---|---|
| 2,297,480 | Kratzmann | Sept. 29, 1942 |
| 2,620,814 | Hobbs | Dec. 9, 1952 |
| 2,734,401 | Berndtson | Feb. 14, 1956 |
| 2,822,901 | Forster | Feb. 11, 1958 |
| 2,853,167 | Kelley | Sept. 23, 1958 |
| 2,916,122 | Hindmarch | Dec. 8, 1959 |